United States Patent
Parrilla et al.

(10) Patent No.: US 10,577,758 B2
(45) Date of Patent: Mar. 3, 2020

(54) ROAD PAVER WITH QUICK COUPLING APPARATUS FOR THE TRANSVERSE DISTRIBUTION DEVICE, AND METHOD

(71) Applicant: BOMAG GmbH, Boppard (DE)

(72) Inventors: Saverio Parrilla, Russi RA (IT); Maurizio Pedriali, Argenta FE (IT); Fabio Baldrati, Alfonsine RA (IT)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 16/217,877

(22) Filed: Dec. 12, 2018

(65) Prior Publication Data

US 2019/0186085 A1    Jun. 20, 2019

(30) Foreign Application Priority Data

Dec. 14, 2017  (EP) ..................................... 17002030
Jan. 16, 2018  (EP) ..................................... 18000032

(51) Int. Cl.
*E01C 19/48*   (2006.01)
*F16B 21/09*   (2006.01)
*F16B 5/02*    (2006.01)

(52) U.S. Cl.
CPC ............ *E01C 19/48* (2013.01); *F16B 5/0225* (2013.01); *F16B 21/09* (2013.01); *E01C 19/4853* (2013.01); *E01C 2301/00* (2013.01)

(58) Field of Classification Search
CPC ...... E01C 19/12; E01C 19/48; E01C 2301/00; F16B 5/0225; F16B 21/09
USPC .................................................. 404/72, 118
See application file for complete search history.

(56) References Cited

U.S. PATENT DOCUMENTS

| 1,732,993 A | 10/1929 | Spiro |
| 5,222,851 A | 6/1993 | Dickerson |
| 5,232,305 A | 8/1993 | Bassett et al. |
| 5,860,764 A * | 1/1999 | Roberts ................. E01C 19/236 404/124 |

(Continued)

FOREIGN PATENT DOCUMENTS

| CN | 102433820 B | 9/2013 |
| EP | 1120495 A1 | 8/2001 |

(Continued)

OTHER PUBLICATIONS

European Patent Office, European Search Report, Application No. 18000032.5, dated Jul. 26, 2018 (11 pages).

*Primary Examiner* — Raymond W Addie
(74) *Attorney, Agent, or Firm* — Wood Herron & Evans LLP (57) ABSTRACT

A road paver includes a height adjustable auger assembly. A support housing of the auger assembly is attached to the road paver via a quick coupling apparatus that facilitates height adjustment of the auger assembly. A plurality of sliding devices are inserted into a respective oblong hole, each oblong hole includes an expanded insertion portion and a vertically extending portion. Wherein the vertically extending portion facilitates height adjustment of the auger assembly. A method of coupling the auger assembly includes inserting the sliding devices into respective oblong holes and adjusting the height of the auger assembly by moving the sliding devices between the expanded insertion portion and the vertically extending portion of the oblong holes.

11 Claims, 9 Drawing Sheets

(56) References Cited

U.S. PATENT DOCUMENTS

| | | | | |
|---|---|---|---|---|
| 6,179,520 B1 * | 1/2001 | Cochran | ................ | E02D 3/074 |
| | | | | 172/245 |
| 6,481,925 B1 * | 11/2002 | Olson | .................... | E01C 19/48 |
| | | | | 404/101 |
| 6,755,482 B2 * | 6/2004 | Johnson | ................ | E01C 23/088 |
| | | | | 299/39.4 |
| 7,458,747 B2 * | 12/2008 | Musil | .................... | E01C 19/185 |
| | | | | 404/101 |
| 8,562,249 B2 * | 10/2013 | Owegeser | ............... | E01C 19/48 |
| | | | | 404/101 |
| 2006/0204335 A1 * | 9/2006 | Guntert, Jr. | .......... | E01C 19/185 |
| | | | | 404/101 |

FOREIGN PATENT DOCUMENTS

| | | |
|---|---|---|
| EP | 2650439 A2 | 10/2013 |
| WO | 2013026197 A1 | 2/2013 |

\* cited by examiner

ROAD PAVER WITH QUICK COUPLING APPARATUS FOR THE TRANSVERSE DISTRIBUTION DEVICE, AND METHOD

CROSS-REFERENCE TO RELATED APPLICATION

The present application claims priority under 35 U.S.C. § 119 of European Patent Application No. 17002030.9, filed Dec. 14, 2017 and European Patent Application No. 18000032.5, filed Jan. 16, 2018, the disclosures of which are hereby incorporated herein by reference in their entireties.

FIELD OF THE INVENTION

The present invention relates to a road paver, particularly a small road paver, for paving a subbase layer in a working direction. Moreover, the present invention also relates to a method for mounting a transverse distribution device on a road paver.

BACKGROUND OF THE INVENTION

Road pavers are usually employed for producing the subbase layer of roads or squares. They are self-propelled construction machines usually including a machine frame and a traveling mechanism, for example, crawler tracks or wheels. The central part of a road paver is the paving screed, which extends transversely to the working direction of the road paver and is usually arranged at the rear of the road paver. The working direction here is the direction in which the road paver travels when paving a subbase layer in working operation. The paving material, for example asphalt or concrete, is usually stored in a material hopper arranged on the front end of the road paver. From there, the paving material is typically transported through the road paver and to the rear using a longitudinal conveyor device configured, for example, as a scraper belt. Here, a transverse distribution device, for example a screw conveyor, distributes the paving material across the full paving width transversely to the working direction. The road paver then screeds the paving material using its paving screed arranged at the rear, during which process the paving material is typically also compacted by means of compacting devices such as pressure bars or tampers arranged on the paving screed.

Small road pavers constitute a subgroup of road pavers, which also serve to pave paving material, for example, asphalt or similar ground material. Small road paver commonly refers to small road pavers having an operating weight (with empty hopper) of less than 10 t and particularly less than 8 t and/or having a track width of less than or equal to 1,500 mm. Small road pavers are employed for paving ground material, for example in spatially constricted working environments, particularly also inside buildings, and/or at small paving widths, in particular, for example, at an average sidewalk width and/or in a milling track. Such a small road paver is known, for example, by the model designation BF 223C manufactured by the applicant.

The transverse distribution device, which distributes the paving material across the paving width just in front of the paving screed in the working direction, and which is supported at the machine frame via a support housing, is usually configured such that it is height-adjustable. Such height adjustment is employed particularly when paving subbase layers of different thicknesses. For example, the transverse distribution device is usually adjusted vertically downwards farther when thinner subbase layers are being paved than when thicker subbase layers are being paved. To implement this vertical adjustment of the transverse distribution device relative to the machine frame, a height adjustment device is typically provided on the road paver. Thus, on the one hand, the transverse distribution device needs to be attached to the road paver in a height-adjustable manner while, on the other hand, said attachment needs to be sufficiently robust for the transverse distribution device to be able to cope with the oftentimes extremely high paving material throughput for paving.

Generic road pavers with transverse distribution devices are known from the prior art. For example, a road paver having boreholes with different diameters distributed in different patterns at the rear part of the machine frame is known from EP 2 650 439 A2. In this manner, transverse distribution devices of different type series can be used with this road paver. U.S. Pat. No. 5,232,305 B describes a road paver in which the transverse distribution device comprises a shield situated on the front in the working direction, which can be clamped to the machine frame via oblong holes. When this clamp connection is released, the transverse distribution device can be adjusted vertically via a hydraulic cylinder and a separate guide rail. Another road paver with a transverse distribution device is known from EP 1 120 495 A1.

So far, the prior art solutions are disadvantageous in that, due to the different requirements with respect to the fastening of the transverse conveyor device, or the transverse distribution device, to the machine frame of the road paver, the transverse distribution device, i.e., its support housing, is implemented with complicated rails for height adjustment and a plurality of threaded and/or pin connections. When the transverse distribution device needs to be demounted for maintenance works, releasing the several fastening devices and the support in the rails oftentimes requires considerable effort. Moreover, it may be advantageous during operation of the road paver to adjust the clearance of the guide rails in which the transverse distribution device, i.e., the support housing, is guided for height adjustment. Due to the complicated fastening of the respective components to the road paver, this oftentimes necessitates partial demounting of the transverse conveyor device.

An object of the present invention is therefore to propose a solution for fastening of the transverse distribution device to a road paver in a most rapid and simple manner. Said solution should not affect the height adjustment and the reliable support of the transverse distribution device. At the same time, a possibility is to be created to adjust the clearance of the guidance of the height adjustment in a simple manner and without demounting any components.

SUMMARY OF THE INVENTION

Specifically, the present invention is achieved for a road paver as described above in that the support housing is supported at the machine frame via a quick coupling apparatus. The quick coupling apparatus comprises at least one oblong hole with an expanded insertion portion and a sliding device. The sliding device is configured such that it can be inserted into the oblong hole through the expanded insertion portion. During vertical adjustment of the transverse distribution device through the height adjustment device, the sliding device in the inserted state slides in the region of the oblong hole outside the expanded insertion portion. In this region, the sliding device is supported in a form-closed manner in a direction perpendicular to the height adjustment. Due to the quick coupling apparatus according to the present invention, no complicated fastening needs to be dealt with when mounting and demounting the transverse distribution device to and from the road paver, respectively. Instead, according to the present invention, the transverse distribution device with its support housing is merely brought close to the machine frame of the road paver at the right height, so that the sliding device enters the oblong hole through the expanded insertion portion. Gravity then causes the sliding device to slide inside the oblong hole into the region of the oblong hole outside the expanded insertion portion. In this state, coupling of the transverse distribution device and its support housing to the machine frame of the road paver is already completed without having had to tighten or remove any fastening means such as a screw or a pin. Thereafter, merely the height adjustment device is attached between the machine frame and the support housing, whereupon the transverse distribution device is already fully mounted. The quick coupling apparatus is thus characterized by the fact that fastening of the transverse distribution device and its support housing to the machine frame of the road paver merely requires movement of the transverse distribution device and the support housing relative to the machine frame. No fastening elements need to be employed. Attaching fastening means may be necessary only for fastening the height adjustment device between the machine frame and the support housing.

According to the present invention, an oblong hole is a recess which extends longitudinally, or in a length direction, and which particularly extends vertically and thus has its largest extension in vertical direction. The expanded insertion portion is a widened portion of the oblong hole located on one end of the oblong hole. At this position, the recess forming the oblong hole is thus wider than in the remaining region of the oblong hole. The expanded insertion portion serves to allow a part of the sliding device which is too large to be pulled out in the region of the oblong hole outside the expanded insertion portion to pass through the oblong hole. In this manner, the sliding device is fixed inside the oblong hole. Height adjustment of the transverse distribution device is performed in the longitudinal direction of the oblong hole. In the directions perpendicular to the height adjustment, however, the sliding device is fixed inside the oblong hole in a form-closed manner. The form closure thus acts, for example, in the working direction and transversely to the working direction and particularly in the entire plane spanned by these directions. Movement of the sliding device is thus blocked in these directions. In other words, the form closure acts horizontally, whereas vertical adjustment of the sliding device, and thus the transverse distribution device, inside the oblong hole is possible.

In principle, it makes no difference whether the oblong hole is arranged in the machine frame of the road paver and the sliding device is arranged on the support housing of the transverse distribution device or vice versa. The corresponding configuration of the oblong holes and the sliding device, respectively, merely needs to be adapted to the respective embodiment. For example, the at least one oblong hole may be arranged in a support plate of the machine frame of the road paver, and the sliding device may be arranged on a connection plate of the support housing. This is also the preferred embodiment. Alternatively, however, the at least one oblong hole may as well be arranged in a connection plate of the support housing, and the sliding device may be arranged on a support plate of the machine frame of the road paver.

The details of the configuration of the sliding device may vary. Basically, what is important is that it includes a wider region which in a direction transverse to the working direction has a wider extension than an adjoining region. The wider region needs to fit through the expanded insertion portion of the oblong hole but at the same time needs to be too wide to be pulled out in the region of the oblong hole outside the expanded insertion portion, particularly in the directions of the form closure described above. To this end, for example, the sliding device comprises a sliding pin and a sliding anchor with an anchor plate, wherein the anchor plate, in a direction transverse to the working direction, has an extension smaller than the expanded insertion portion of the oblong hole but larger than the oblong hole in its region outside the expanded insertion portion. The term "anchor plate" is not to be interpreted as limiting. For example, the anchor plate might also be a pin region extending transversely to the remaining part of the sliding pin, for example, in a T-shape. What is important is that the sliding device engages through and behind the plate or other component having the oblong hole through the oblong hole and thereby the form closure, particularly in the working direction, is achieved between the sliding device and the component having the oblong hole. Furthermore, the sliding pin, the sliding anchor and the anchor plate may, for example, be configured as one integral component.

Generally, the entire sliding device may be configured to be integral with the machine frame or the support housing. In such an embodiment, the sliding distance would always be the same. The sliding distance refers to the distance between the anchor plate engaging behind the component having the oblong hole and the component to which the sliding device is fastened in a state in which the sliding device is completely inserted into the oblong hole. In other words, the sliding distance refers to the size, as seen in the working direction, of the region in which the component having the oblong hole rests against the sliding device. The sliding device is therefore a measure of the clearance of the guidance of the sliding device inside the oblong hole in the working direction of the road paver. As it may be necessary in different operating situations of the road paver to either enlarge or reduce this clearance, the sliding device is preferably configured such that the sliding distance between the anchor plate of the sliding anchor and the component to which the sliding device is fastened can be set through a sliding distance adjustment apparatus. However, this cannot be achieved with an integral sliding device. Accordingly, the sliding device needs to include at least two components which are movable relative to each other. For example, the sliding device may comprise a sliding pin with a sliding anchor, wherein the sliding anchor is arranged on one end of the sliding pin. The end of the sliding pin located opposite the sliding anchor is guided through a borehole in the component that is to have the sliding device arranged thereon. Thereafter, for example, a nut or a wing nut is screwed onto this end of the sliding pin, via which the projection of the sliding pin and the sliding anchor on the other side of the borehole can be set. In this manner, a sliding distance adjustment apparatus, via which a desired sliding distance can be set by further tightening or loosening the nut, can be implemented in a cost-effective manner.

Generally, the sliding distance might be totally freely selectable via the sliding distance adjustment apparatus. In this case, it would be possible, for example, to tighten the sliding anchor at the oblong hole like a screw head and to thereby achieve fastening of the support housing to the machine frame. However, as already described above, according to the invention, the vertical mobility, i.e., the height adjustment of the transverse distribution device, is to be maintained. Therefore, the sliding device preferably includes a spacer which is configured such that there is always at least a minimum sliding distance essentially corresponding to the thickness of the support plate and/or the connection plate. In this manner, a tightening of the sliding anchor is avoided, so that there is always sufficient clearance between the sliding anchor and the component having the oblong hole, so that the possibility of vertical height adjustment of the transverse distribution device and the support housing is maintained. Such a spacer may be, for example, a region of the sliding anchor which is narrower than the anchor plate and therefore fits into the oblong hole but is at the same time wider than the borehole in the component having the sliding device. This narrower region of the sliding anchor therefore spaces the anchor plate from the component to which the sliding device is fastened. This spacing constitutes the minimum sliding distance.

For the sliding distance to be adjustable also during working operation, it is preferred that in the mounted state of the transverse distribution device the sliding distance adjustment apparatus is arranged at the rear of the road paver in the working direction and can be accessed from here for actuation. The sliding distance adjustment apparatus is particularly also arranged at the rear of the support housing of the transverse distribution device in the working direction. Normally, the operator platform with the cabin for the operator of the road paver is arranged directly in front of the part of the machine frame to which the support housing of the transverse distribution device is fastened. Therefore, space conditions are particularly confined especially in this region. A simple sliding distance adjustment apparatus can thus be achieved, for example, if the sliding pin projects out of the rear of the support housing in the working direction, where, for example, the nut, acting as a fastening means and a sliding distance adjustment apparatus, is screwed onto the sliding pin. The rear end of the support housing can usually be easily accessed even during working operation, so that no components need to be demounted to create access for adjusting the sliding distance.

In order to ensure reliable fastening of the support housing of the transverse distribution device to the machine frame, the quick coupling apparatus preferably includes more than one unit consisting of an oblong hole and a sliding device. For example, the quick coupling apparatus may include two oblong holes and two sliding devices. A spacing between the respective units consisting of an oblong hole and a sliding device, for example transversely to the working direction or in vertical direction, further increases the stability of the connection of the support housing to the machine frame. Therefore, according to one embodiment, the quick coupling apparatus comprises at least three oblong holes and three sliding devices, wherein the oblong holes and the sliding devices are respectively spaced from one another transversely to the working direction and/or vertically. The quick coupling apparatus thus includes three units respectively consisting of an oblong hole and a sliding device. This embodiment is particularly stable if these three units are arranged relative to one other in the shape of a triangle, said triangle being oriented particularly in a plane perpendicular to the working direction. In this manner, the three fastening points of the quick coupling apparatus are distributed in an advantageous manner, so that the support housing is prevented from tilting in any direction relative to the machine frame. Of course, it is also possible to employ more than three such units respectively consisting of an oblong hole and a sliding device.

In addition to the quick coupling apparatus and the height adjustment device, a further additional fastening device might in principle be employed for fixation of the support housing, i.e., the transverse distribution device, to the machine frame. However, in order to configure the entire structure such that it is as simple as possible and thus can be fastened and/or removed with little effort, additional fastening means are preferably dispensed with. In the preferred case, the transverse distribution device is thus supported at the machine frame exclusively via the quick coupling apparatus and the height adjustment device. Mounting of the transverse distribution device at the machine frame therefore merely comprises hooking the sliding device into the oblong hole and attaching the height adjustment device. Such mounting can be carried out in a particularly quick and simple manner, especially because hooking of the sliding device into the oblong hole does not require any additional works such as attaching fastening means. The quick coupling apparatus according to the invention achieves both fastening of the support housing of the transverse distribution device to the machine frame and guidance of the support housing during height adjustment. Therefore, there is no need for further fastening and/or guidance.

In order to further facilitate mounting of the transverse distribution device, i.e., the support housing of the transverse distribution device, to the machine frame, a mounting aid is preferably provided. The mounting aid is to facilitate correct positioning of the support housing at the machine frame such that the sliding device can be inserted through the expanded insertion portion of the oblong hole. To this end, the mounting aid and the support housing are configured such that the sliding device and the expanded insertion portion of the oblong hole are at equal height when the support housing strikes against the mounting aid. For example, a counter stop is formed on the support housing, which is to rest against the stop of the mounting aid when the correct position of the support housing relative to the machine frame has been reached. In this embodiment, the support housing can be brought to a position closely behind the machine frame and then merely needs to be lifted or lowered vertically until the stop of the mounting aid rests against the counter stop of the support housing. In this position, the support housing can then be brought into full contact with the machine frame, whereby the sliding device is inserted in the expanded insertion portion of the oblong hole. In this manner, the correct height of the support housing relative to the machine frame does not need to be found by blind guessing, which might otherwise have to be carried out under low visibility conditions. Mounting is thus substantially facilitated.

Mounting becomes even easier if, according to one embodiment, the mounting aid includes an inclined face, along which the support housing can be guided in a sliding manner until the sliding device and the expanded insertion portion of the oblong hole are at equal height. The inclined face thus acts as a guide for the support housing during movement of the support housing towards the machine frame. Accordingly, when bringing the support housing close to the machine frame, it is not necessary to make contact exactly at the position in which the sliding device is inserted through the expanded insertion portion of the oblong hole; instead, it is sufficient if the support housing is brought close to the machine frame in the region of the inclined face of the mounting aid. In this case, further centering of the support housing to the correct position for insertion of the sliding device in the expanded insertion portion of the oblong hole is achieved automatically through guidance of the support housing along the inclined face of the mounting aid. The inclined face of the mounting aid may be configured as a guide in horizontal direction and/or as a guide in vertical direction.

In order to keep the complexity of the road paver according to the present invention, and thus also the manufacturing costs, as low as possible, the mounting aid is at the same time configured as a bearing for the height adjustment device. In other words, the height adjustment device is fastened to the machine frame via the mounting aid. As described above, the other side of the height adjustment device is fastened to the support housing, so that overall the height adjustment device can vertically adjust the height of the transverse distribution device.

In principle, it would be possible for the height adjustment device to adjust the support housing, and thus the transverse distribution device, across the entire extension of the oblong hole. In this embodiment, the height adjustment device may thus, for example, move the sliding device as far as into the expanded insertion portion of the oblong hole. Such a movement may be utilized, for example, as an aid for demounting the support housing. However, in order to avoid that the sliding device slides out of the expanded insertion portion of the oblong hole unintentionally during working operation of the road paver and thus causes an accident involving potential damage to the road paver or danger to operators, the adjustment path of the height adjustment of the support housing and particularly the sliding device does not extend as far as to the expanded insertion portion of the oblong hole. In other words, the height adjustment device is configured such that its stroke corresponds to the extension of the region of the oblong hole outside the expanded insertion portion. It is thus not possible for the height adjustment device to move the sliding device as far as into the expanded insertion portion. In this manner, inadvertent disengagement of the support housing from the machine frame during working operation is excluded and operational safety is increased.

To facilitate the mounting of the transverse distribution device on the road paver even further, according to an embodiment of the invention, the sliding device is provided with a stop surface which is configured to interact with a stopper provided on the support housing so as to rotationally lock the sliding device in its position. The sliding device, and especially the sliding anchor, are, for example, provided with a flat surface, for example, on the top end or side. Additionally, a stopper is provided on the connection plate of the support housing, for example, by providing a threaded bore in the connection plate and a screw inserted into said threaded bore. The screw protrudes from the connection plate in the working direction and strikes or butts against the stop surface of the sliding device. A rotation of the sliding device is thus prevented, with the sliding device being locked in the rotational position necessary for the insertion into the oblong hole.

The above-described object is further achieved with a method for mounting a transverse distribution device on a road paver, particularly a road paver as described above. The method according to one embodiment of the invention comprises the steps of: inserting a sliding device via an expanded insertion portion of an oblong hole into said oblong hole, and arranging a height adjustment device between the road paver and the transverse distribution device, wherein the sliding device in the inserted state is guided in a sliding manner in the region of the oblong hole outside the expanded insertion portion during vertical adjustment of the transverse distribution device, wherein the sliding device is supported in a form-closed manner in a direction perpendicular to the height adjustment in this region. All features, advantages and effects of the road paver according to the present invention as described above similarly apply to the method according to the present invention. Merely to avoid repetition, reference is made to the corresponding explanations regarding the road paver. The preferred embodiments described for the road paver are also applicable to the method.

BRIEF DESCRIPTION OF THE DRAWINGS

The invention will be explained in more detail below by reference to the embodiment examples shown in the figures. In the schematic figures.

DETAILED DESCRIPTION OF THE INVENTION

Figure 1:
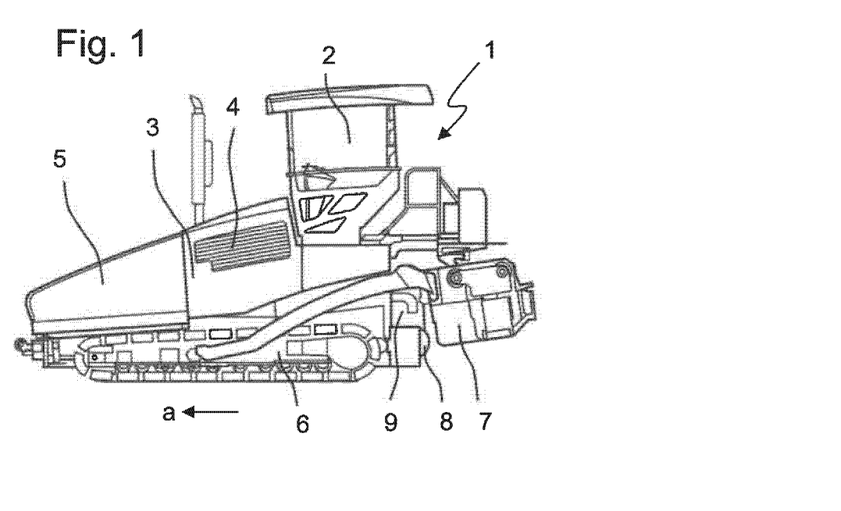
FIG. 1 is a side view of a road paver according to one embodiment of the present invention.
Figure 2:
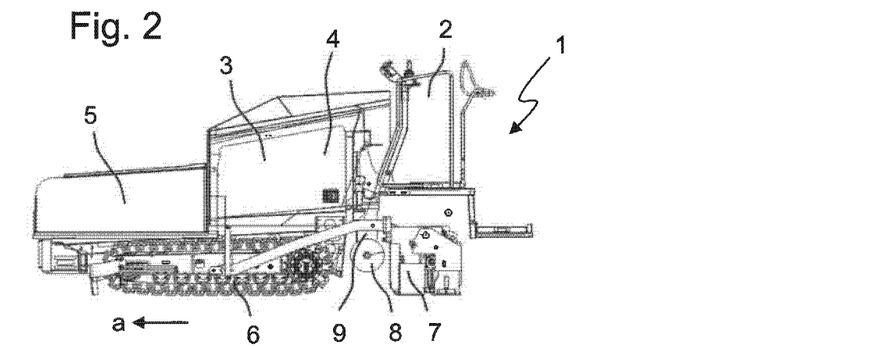
FIG. 2 is a side view of a small road paver with the transverse distribution device adjusted vertically upwards.
Figure 3:
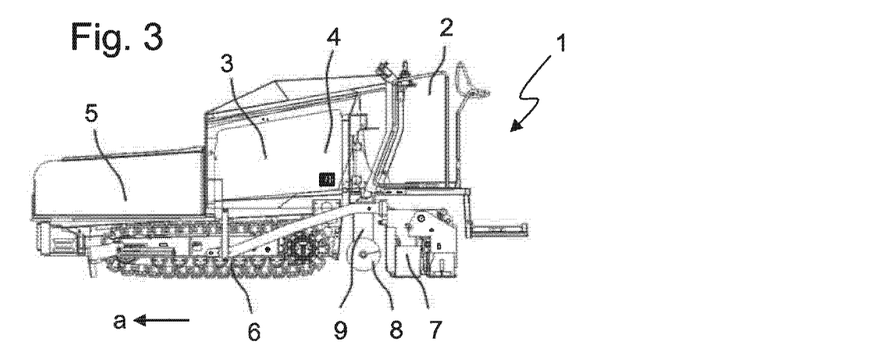
FIG. 3 is a side view of a small road paver with the transverse distribution device adjusted vertically downwards.

FIGS. 1 to 3 show exemplary road pavers 1 in which the present invention is used. The road pavers 1 include an operator platform 2 as well as a machine frame 3 with a traveling mechanism 6. In the embodiments shown, the traveling mechanism 6 is depicted with crawler tracks, although wheels might be employed as well. A drive engine 4, for example a diesel combustion engine, is used for propulsion of the road pavers 1. In the front in the working direction a, the road pavers 1 include a material hopper 5 for receiving paving material. The paving material is transported from the material hopper 5 through the so-called tunnel against the working direction a to the rear of the road paver 1, where a transverse distribution device 8 is arranged on a support housing 9. The transverse distribution device 8 distributes the paving material transversely to the working direction a across the full paving width of the road paver 1. The paving screed 7, which screeds the paving material and compacts it by means of compacting devices such as pressure bars or tampers provided at the screed 7, is arranged behind the transverse distribution device 8 in the working direction a. FIG. 1 shows a road paver 1 with a very large possible paving width, whereas FIGS. 2 and 3 respectively show a small road paver. In FIG. 2, the transverse distribution device 8 is lifted for paving a thick subbase layer, whereas the transverse distribution device 8 in FIG. 3 is vertically lowered in order to produce a subbase layer with a small paving thickness.

Figure 4:
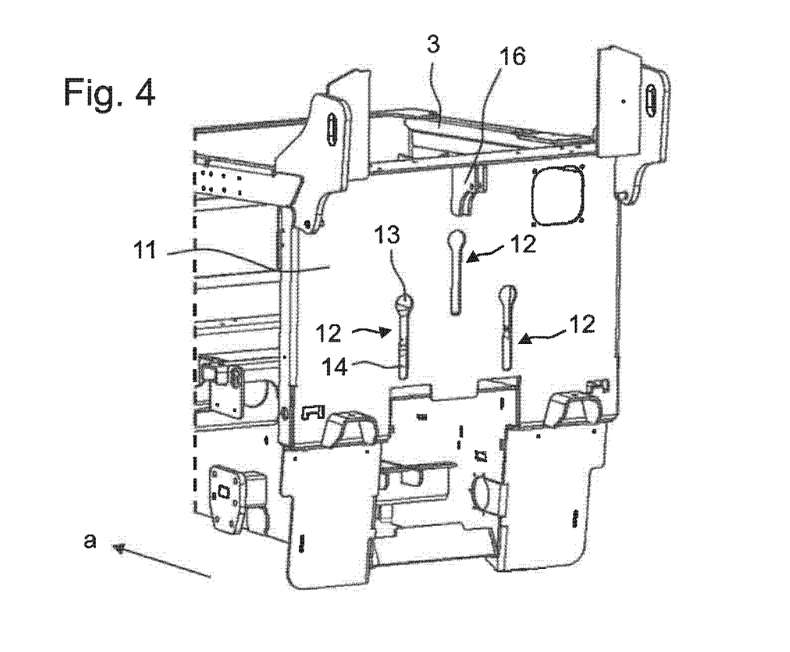
FIG. 4 is a perspective view of the rear of a road paver according to one embodiment of the present invention.

FIG. 4 shows the machine frame 3 of the road paver 1 in an oblique perspective rear view. For reasons of clarity, neither the paving screed 7 nor the transverse distribution device and its support housing 9 are depicted. The shown part of the machine frame 3 of the road paver 1 is therefore the part to which the support housing 9 with the transverse distribution device 8 is fastened. To this end, the machine frame 3 includes a support plate 11, with which the machine frame 3 terminates to the rear in the working direction a. The support plate 11 includes a total of 3 oblong holes 12, each of which includes a widened portion configured as an expanded insertion portion 13 and a narrower region configured as a sliding guide 14. Two of the oblong holes 12 are spaced from one another horizontally and transversely to the working direction a. The third oblong hole 12 is situated centrally between the two first oblong holes 12 transversely to the working direction a, and is offset vertically upwards relative to these. Furthermore, FIG. 4 also shows a mounting aid 16, which will be described in more detail below.

Figure 5:
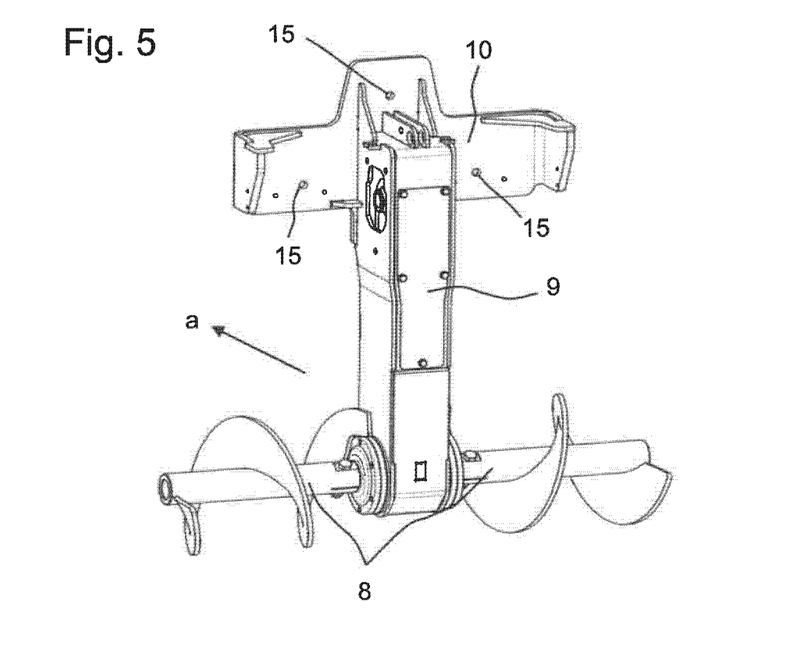
FIG. 5 is an oblique perspective rear view of a transverse distribution device with support housing.

FIG. 5 is an oblique perspective rear view of a transverse distribution device 8, which in the present embodiment is configured as a screw conveyor, together with a support housing 9. The transverse distribution device 8 is driven by a motor (not shown) accommodated inside the support housing 9, for example, a hydraulic motor. Thus, the hydraulic motor merely needs to be connected to hydraulic lines of the road paver 1, which due to their flexibility do not restrict the vertical height adjustment of the transverse distribution device and the support housing. Furthermore, the support housing 9 includes a connection plate 10, with which the support housing 9 in the mounted state rests against and slides along the support plate 11 of the machine frame 3 of the road paver 1. In order to achieve stable fastening and to avoid tilting of the support housing at the support plate 11, the connection plate 10 is configured such that it has an even or planar front side (see, for example, FIG. 7). The connection plate 10 includes three boreholes 15 distributed in a pattern matching the oblong holes 12 of the support plate 11.

Figure 6:
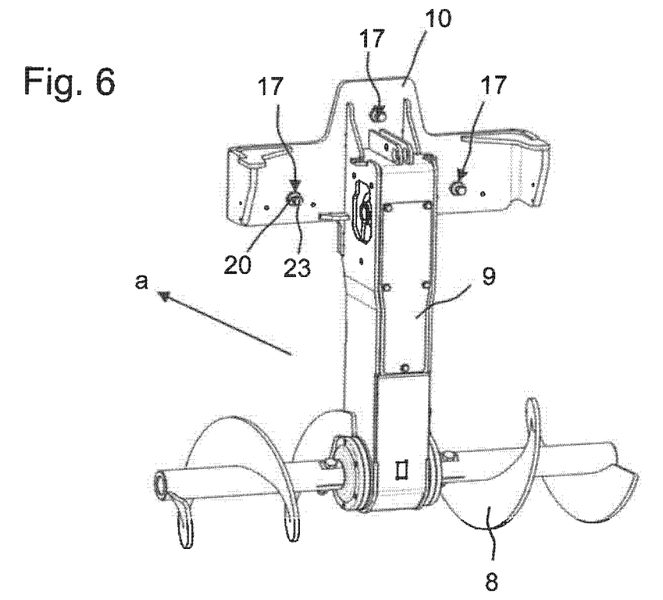
FIG. 6 is a view of a transverse distribution device with support housing according to FIG. 5 with sliding device.
Figure 7:
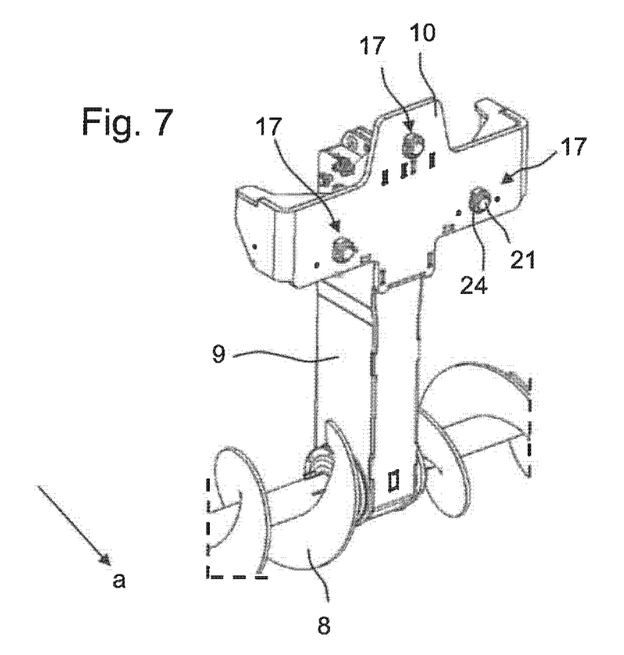
FIG. 7 is an oblique perspective front view of the transverse distribution device with support housing according to FIG. 6.

As can be taken from FIGS. 6 and 7, the boreholes 15 in the connection plate 10 of the support housing 9 are configured to receive a respective sliding device 17. The sliding devices 17 are inserted into the boreholes 15 and project out of the connection plate 10 on both sides of the boreholes 15, as can be taken from a comparison of FIGS. 6 and 7. FIG. 7 shows the support housing 9 and the transverse distribution device 8 in an oblique perspective front view. FIG. 7 therefore shows the side of the connection plate 10 which in the mounted state rests against the side of the support plate 11 of the machine frame 3 shown in FIG. 4.

Figure 8:
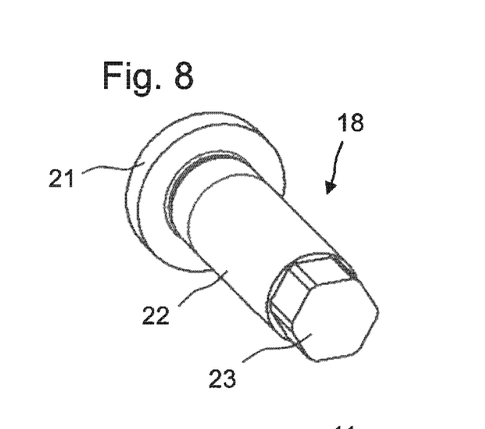
FIG. 8 is a perspective view of a sliding pin.
Figure 9:
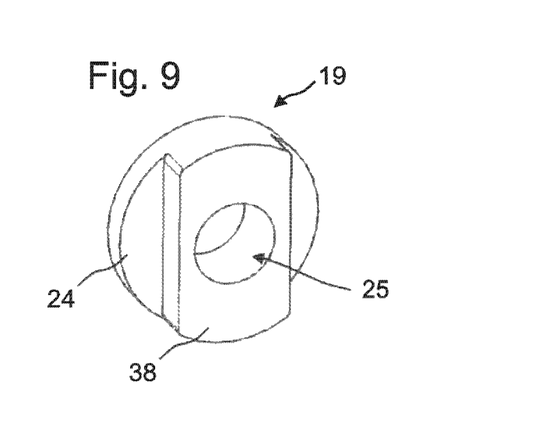
FIG. 9 is a perspective view of a sliding anchor.

The structure and function of the sliding devices 17 can be taken from FIGS. 8, 9, 10 and 11. FIG. 8 shows a sliding pin 18 with a pin head 21, a pin shaft 22 and a holding end 23. The pin head 21 has a larger diameter than the pin shaft 22. The pin shaft 22 is at least partially provided with a male thread, onto which a nut 20 (see FIG. 10) can be screwed. The holding end 23 is situated at the end of the pin shaft 22 of the sliding pin 18 opposite the pin head 21. The peripheral surface of the holding end 23 is configured such that it can be easily held by an operator, for example, with pliers. In the embodiment shown, the holding end 23 is configured as a hexagon, although it may as well have different suitable shapes. FIG. 9 depicts a sliding anchor 19. The sliding anchor 19 includes an anchor plate 24, a spacer 38 and a pin receptacle 25. The anchor plate 24 of the sliding anchor 19 has a diameter which is larger than the sliding guide 14 of the oblong hole 12. At the same time, however, the diameter of the anchor plate 24 is smaller than the expanded insertion portion 13 of the oblong hole 12. The spacer 38 is dimensioned such that it fits into the sliding guide 14. Thus, in at least one of the directions transverse to the working direction a, the spacer 38 is configured narrower than the oblong hole 12 in the region outside the expanded insertion portion 13. At the same time, however, the spacer 38 is configured such that it does not fit into the borehole 15 of the connection plate 10. The pin receptacle 25, on the other hand, is dimensioned such that the sliding pin 18 can be inserted into the pin receptacle 25 with its holding end 23, the pin head 21, however, having a diameter which prevents the sliding pin 18 from slipping through the sliding anchor 19. Since the sliding anchor 19 can freely rotate about the sliding pin 18 when fitted onto the sliding pin 18, it is sufficient if the spacer 38 is configured narrower than the sliding guide 14 of the oblong hole 12 only in one direction transverse to the working direction a.

Figure 10:
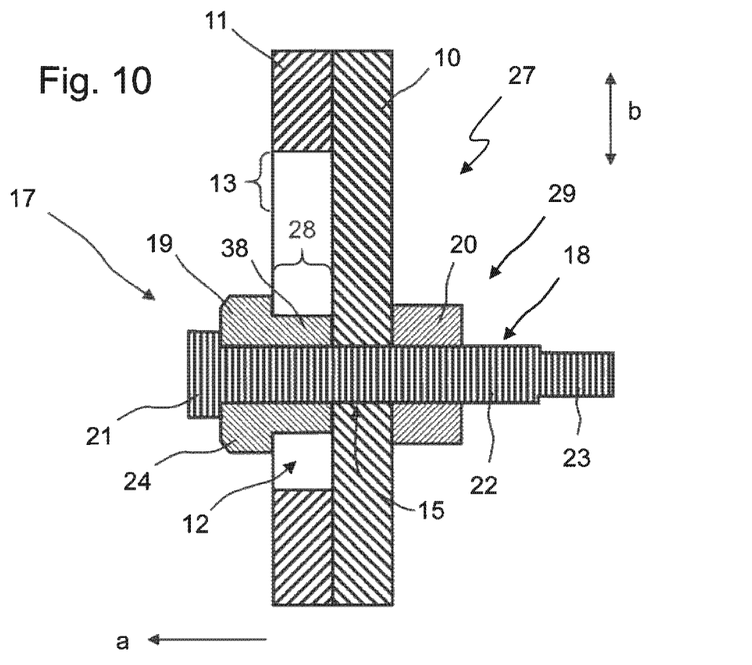
FIG. 10 is a sectional view through a sliding device inserted into an oblong hole.
Figure 11:
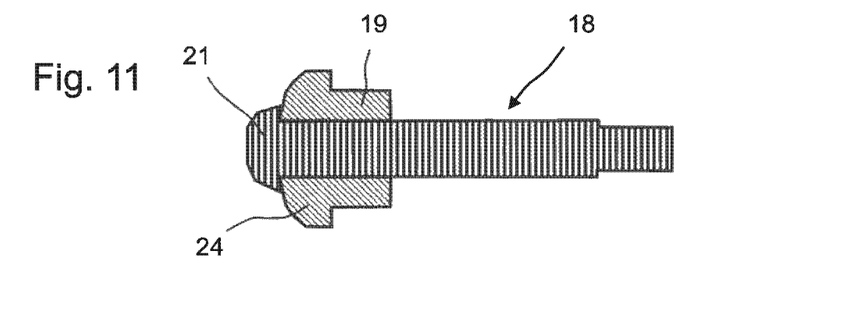
FIG. 11 is a sectional view of a sliding pin with sliding anchor.

FIGS. 10 and 11 respectively show cross-sections through a sliding pin 18 with the sliding anchor 19 fitted onto it. FIG. 10 shows the sliding device 17 when mounted on the road paver 1. Therefore, the entire quick coupling apparatus 27 according to the invention can be seen in FIG. 10. In the mounted state, the connection plate 10 of the support housing 9 rests against the support plate 11 of the machine frame 3 in a sliding manner. Via a height adjustment device 26 (see FIG. 14), the support housing 9, and thus the connection plate 10, can be adjusted relative to the machine frame 3, and thus the support plate 11, in the height adjustment direction b, perpendicularly to the working direction a. The support plate 11 includes an oblong hole 12 including an expanded insertion portion 13 situated in its vertically upper region, i.e., at its vertically upper end. The connection plate 10, on the other hand, includes a borehole 15, through which a sliding device 17 is passed. The sliding device 17 comprises a sliding pin 18 with a pin head 21 and a pin shaft 22. A sliding anchor 19 is fitted onto the pin shaft 22. The pin head 21 prevents the sliding pin 19 from slipping off the pin shaft 22 in the working direction a. The sliding anchor 19 in turn includes an anchor plate 24 and a spacer 38. The anchor plate 24 is configured such that it can be passed through the expanded insertion portion 13 of the oblong hole 12 in or against the working direction a but at the same time has a diameter too large for it to be pulled out of the oblong hole 12 against the working direction a in the region of the oblong hole 12 outside the expanded insertion portion 13. Thus, in the view shown in FIG. 10, the anchor plate 24 protrudes beyond the extension of the oblong hole 12 in the direction perpendicular to the picture plane, so that the anchor plate 24 rests against the connection plate 11 against the working direction a in a form-closing manner. A sliding distance adjustment apparatus 29 is arranged on the end of the sliding pin 18 opposite the sliding pin 19 and also on the other side of the connection plate 10. It comprises a male thread (not depicted) arranged on the pin shaft 22 of the sliding pin 18, onto which a nut 20 can be screwed. To this end, the pin shaft 22 may be held at the holding end 23, for example, with pliers. The sliding distance 28 between the anchor plate 24 and the connection plate 10 is adjusted depending on how firmly the nut 20 is tightened. In the situation shown in FIG. 10, the nut 20 is firmly tightened, so that the spacer 38 rests directly against the connection plate 10. The spacer 38 is dimensioned such that the minimum sliding distance 28 existing in the shown state essentially corresponds to the thickness of the support plate 11. Due to the spacer 38, this minimum sliding distance 28 cannot be reduced any further. Thus, the anchor plate 24 can slide with its rear surface in the working direction a on the front surface of the support plate 11 in the working direction a even if the nut 20 is firmly tightened, so that the height adjustability in the height adjustment direction b is ensured. In contrast, if the nut 20 is loosened, the sliding pin 18 can be pushed through the borehole 15 in the working direction a a bit further, thereby increasing the sliding distance 28 and thus the clearance between the anchor plate 24 and the support plate 11.

FIG. 11 shows an alternative embodiment of the pin head 21 and the front side of the sliding anchor 19, i.e., the anchor plate 24, in the working direction a. According to this embodiment, the pin head 21 and the anchor plate 24 have a self-centering shape and are particularly configured such that they taper towards the front in the working direction a. The self-centering effect is thus achieved through inclined faces with a downward slope towards the front in the working direction a, which aid in inserting the sliding device 17 into the expanded insertion portion 13 of the oblong holes 12. In this manner, mounting is further simplified.

Figure 12:
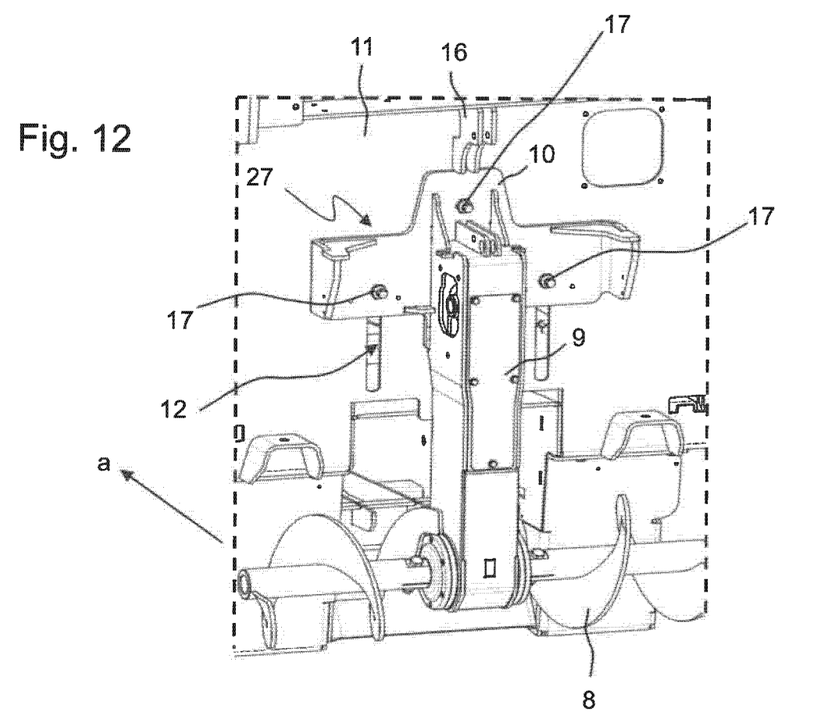
FIG. 12 is an oblique perspective rear view of a transverse distribution device with support housing at the rear of a road paver.
Figure 13:
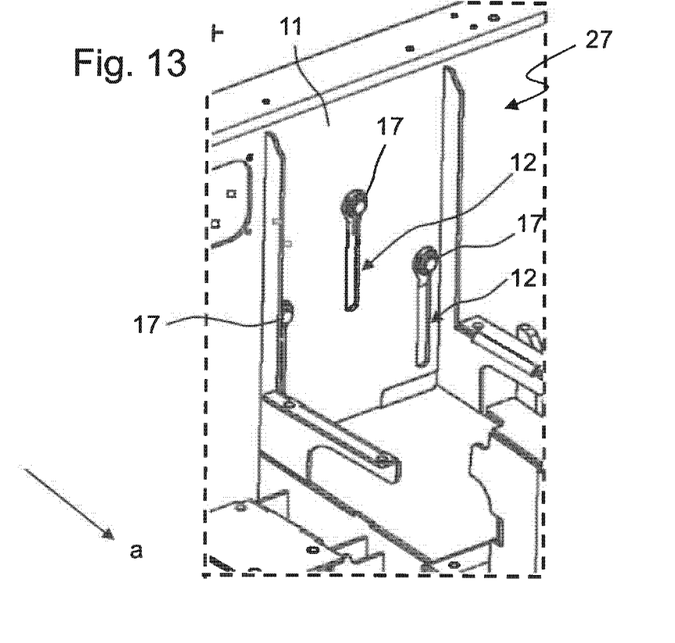
FIG. 13 is an oblique perspective front view of the transverse distribution device with support housing at the rear of the road paver according to FIG. 12.
Figure 14:
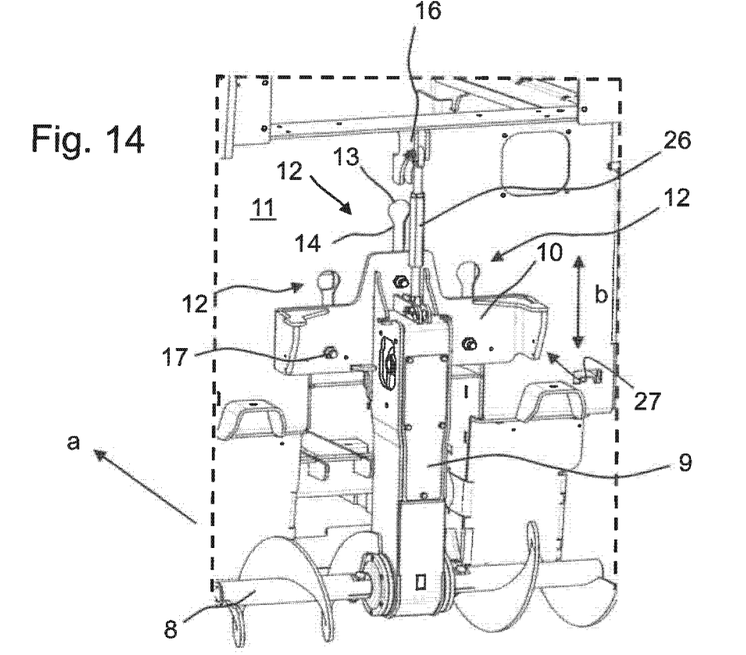
FIG. 14 is an oblique perspective rear view of a transverse distribution device with support housing at the rear of a road paver when fully mounted.
Figure 15:
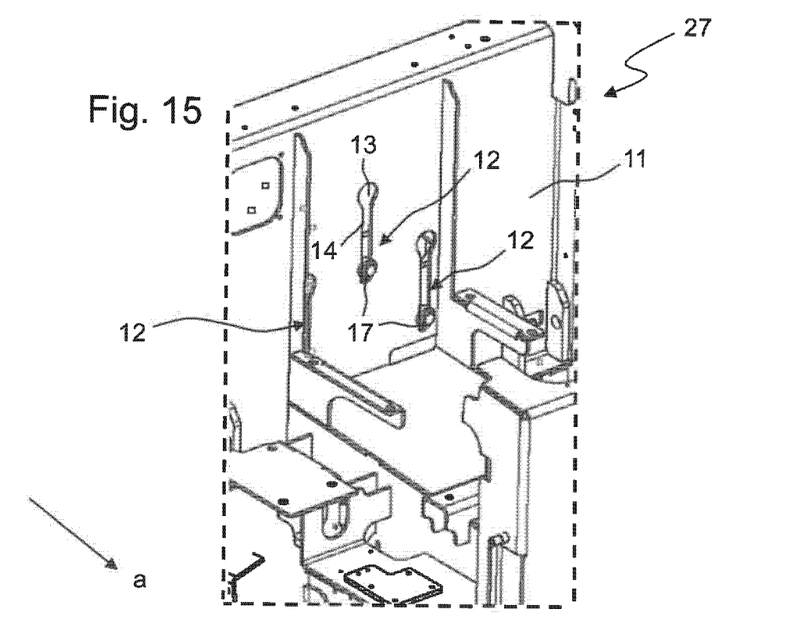
FIG. 15 is an oblique perspective front view of the transverse distribution device with support housing at the rear of the road paver according to FIG. 14.
Figure 16:
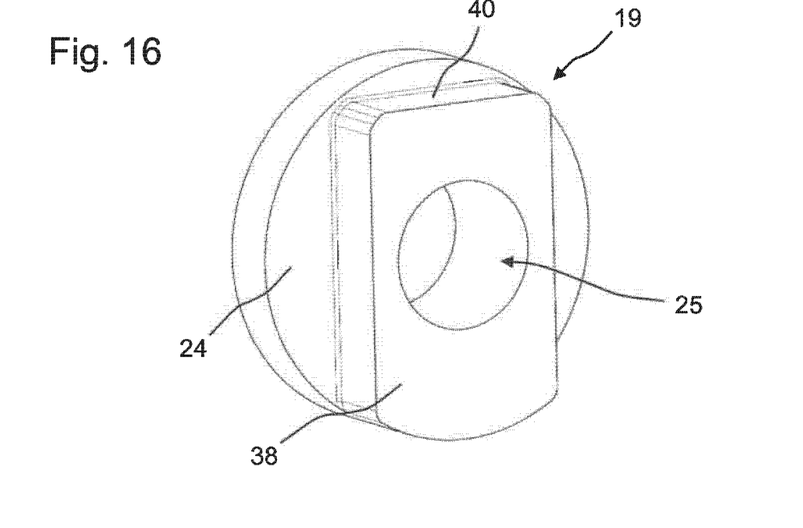
FIG. 16 is a perspective view of an alternative embodiment of a sliding anchor.

FIGS. 12 to 15 each show the support housing 9 and the support plate 11 of the machine frame 3 in a state in which the sliding devices 17 are inserted into the oblong holes 12. FIGS. 12 and 13 here show the state in which the sliding devices 17, particularly the pin head 21 and the sliding anchor 19, are inserted into the expanded insertion portion 13 of the oblong holes 12. In this state, as can be seen particularly from FIG. 12, the support housing 9, particularly with its connection plate 10, strikes against the mounting aid 16. The support housing 9 thus cannot be moved vertically upwards any further since such a movement is prevented by the mounting aid 16. In this manner, the mounting aid 16 ensures that the sliding devices 17 are exactly at the height of the expanded insertion portion 13 of the oblong holes 12. FIGS. 14 and 15 illustrate the same situation except that the support housing 9, and thus also the sliding devices 17, are displaced vertically downwards. The sliding devices 17 are therefore no longer located in the region of the expanded insertion portion 13 but in the region of the sliding guide 14 of the oblong holes 12. In this region, the sliding anchor 19 prevents the sliding devices 17 from slipping out against the working direction a. FIG. 14 furthermore shows the height adjustment device 26, which in this state is arranged between the mounting aid 16 and the support housing 9 of the transverse distribution device 8. In the embodiment shown, the height adjustment device 26 is configured as a hydraulic cylinder connected to the mounting aid 16 on one side and to the support housing 9 on the other side in an articulate manner. The support housing 9, and thus also the transverse distribution device 8, is adjusted in the height adjustment direction b through retraction or expansion of the hydraulic cylinder of the height adjustment device 26. During this process, the sliding device 17 slides inside the sliding guide 14 of the oblong holes 12. The stroke of the height adjustment device 26 is chosen such that the sliding device 17 cannot be lifted as far as into the expanded insertion portion 13 of the oblong holes 12. In this manner, it is avoided that the sliding devices 17 inadvertently slip out of their engagement during working operation of the road paver 1. When the sliding devices 17 are in the position according to FIGS. 12 and 13, i.e., the sliding devices 17 have just been inserted through the expanded insertion portions 13, the subsequent vertical adjustment of the support housing 9, which results in the sliding devices 17 being located in the region of the sliding guide 14 of the oblong holes, can occur merely through gravity. No further fastening is necessary. Finally, merely the height adjustment device 26 remains to be mounted.

Figure 17:
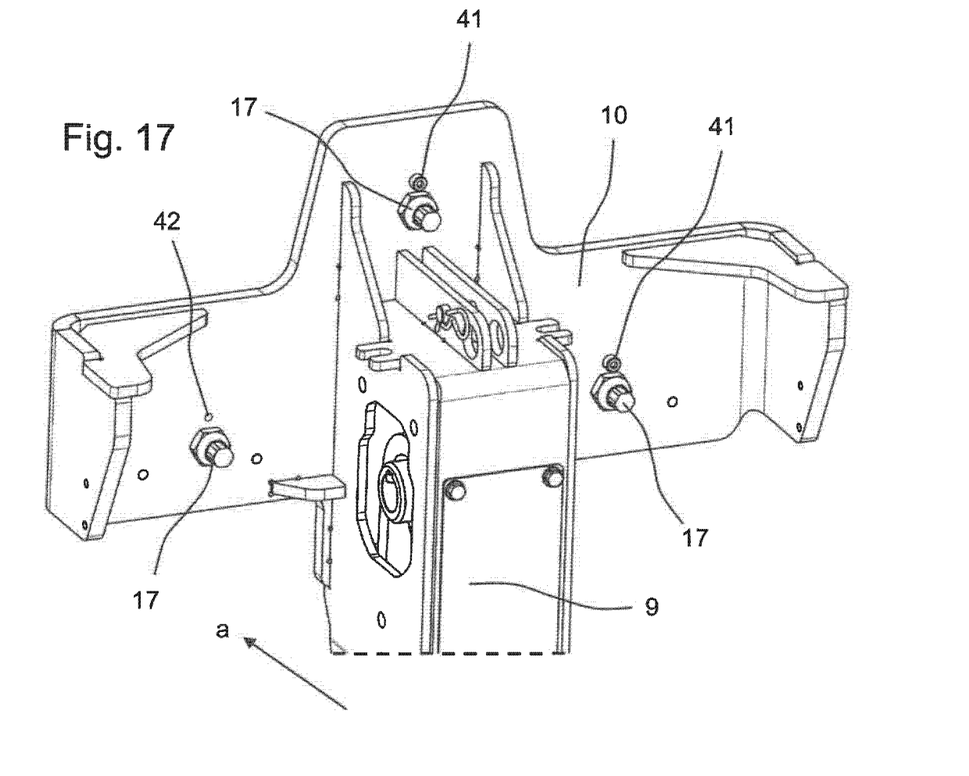
FIG. 17 is an oblique perspective rear view of the top part of an alternative embodiment of a transverse distribution device with support housing.
Figures 18, 19:
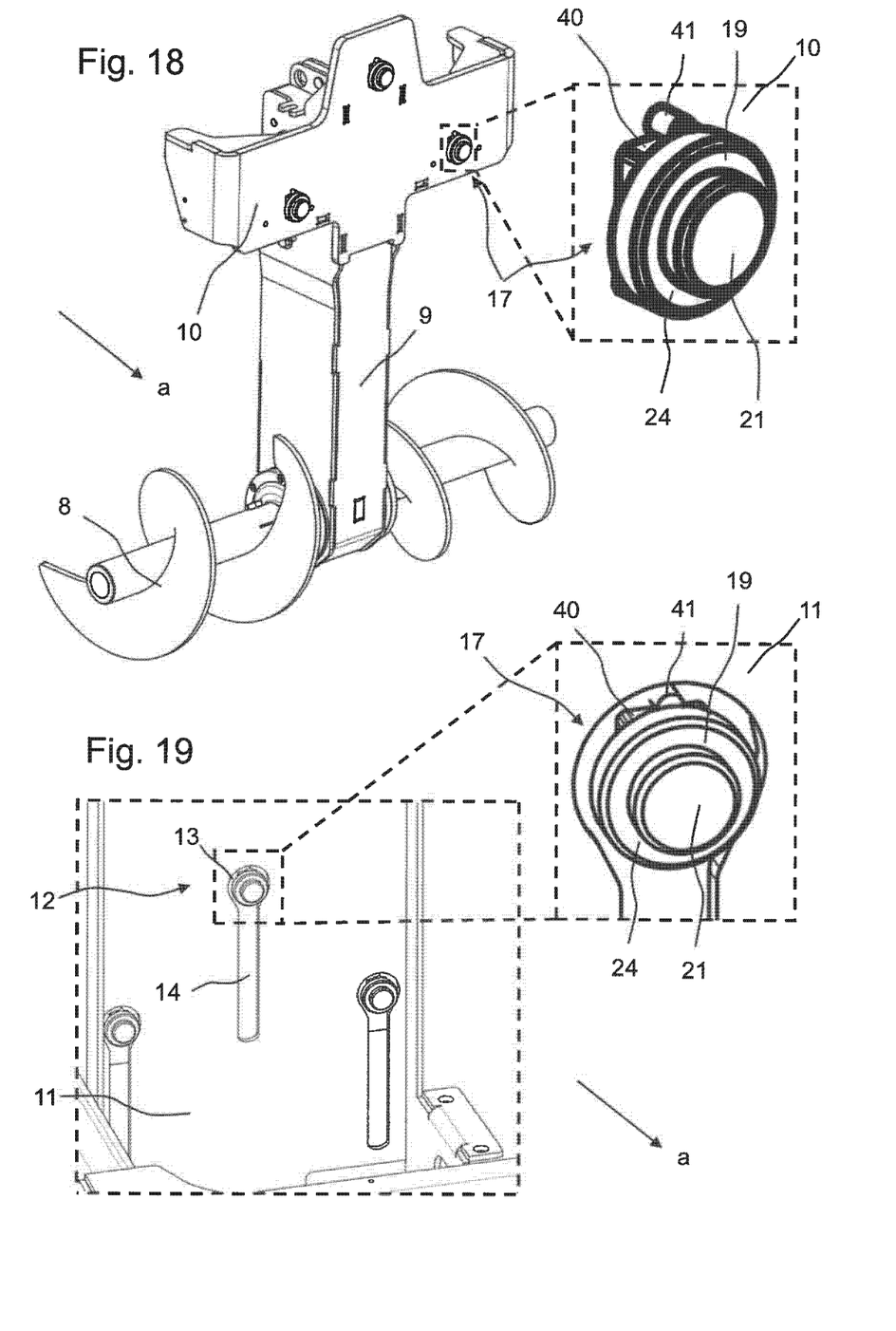
FIG. 18 is an oblique perspective front view of the transverse distribution device with support housing according to FIG. 17 with enlarged sliding device.
FIG. 19 is an oblique perspective front view of the transverse distribution device with support housing at the rear of the road paver according to FIG. 18 with enlarged sliding device.

FIGS. 16 to 19 illustrate an alternative embodiment of the invention including a device for the prevention of rotation of the sliding anchor 19 including a stop surface and a stopper. The embodiment of FIGS. 16-19 corresponds to the previously described embodiment so that only the difference to the previously described embodiment is explicitly mentioned. According to FIG. 19, the sliding anchor 19 of the embodiment shown has a spacer 38 with one side, the top side in the example shown, being arranged as a stop surface 40. In the shown embodiment, the stop surface 40 is arranged as a flat surface on the uppermost end of the spacer 38, however, other embodiments are possible, for example, a concave surface or a surface having one or more protrusions provided for receiving screws 41, as explained below. As shown in FIG. 17, a threaded bore 42 is provided in close proximity to the sliding devices 17 or to the boreholes 15 in the connection plate 10. In the example as shown, the threaded bores 42 are provided above the boreholes 15. Thus, a total of three threaded bores 42 are provided, one for each borehole 15. The threaded bores 42 are provided to receive screws 41, two of which are already shown inserted into their respective threaded bores 42 in FIG. 17. The threaded bores 42 span the whole thickness of the connection plate 10 so that the screws 41, which are longer than the thickness of the connection plate 10, protrude out of the threaded bores 42 on the other side of the connection plate 10 in the working direction a. By tightening the screws 41 in the threaded bores 42, the screws 41 are fixed in their position on the connection plate 10. The effect of the screws 41 can be seen in FIGS. 18 and 19. The threaded bores 42 and the screws 41 are provided so that in the mounted state, the tip of the screws 41 protruding from the threaded bores 42 of the connection plate 10 in the working direction a butt or strike against the stop surface 40 of the spacer 38 of the sliding anchor 19. Thereby, when both the screws 41 and the sliding device 17 are mounted on the connection plate 10, the sliding anchor 19 is held in its rotational position by the screws 41 acting on the stop surface 40. In other words, the screw 41 resting against the stop surface 40 prevents a rotational movement of the sliding anchor 19 around an axis parallel to the working direction a. The spacer 38 is thus locked in the rotational position required for insertion into the sliding guide 14 of the oblong holes 12 of the support plate 11, as shown in FIG. 19. By the provision of the screws 41 and the stop surface 40, canting and jamming of the spacer 38 in the guide 14 can be prevented when mounting the transverse distribution device 8 on the road paver 1.

Figure 20:
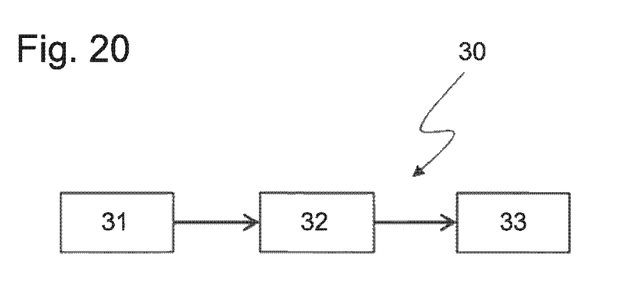
FIG. 20 is a flow chart of the method for mounting the transverse distribution device on a road paver.

FIG. 20 shows a flow chart of the method 30 according to one embodiment of the present invention for mounting the transverse distribution device 8 on the road paver 1. The method 30 starts at step 31 with inserting the sliding device 17 into the expanded insertion portion 13 of the oblong hole 12. In step 32, this is followed by lowering the support housing 9, and thus the sliding devices 17, into the sliding guide 14 of the oblong holes 12, particularly exclusively through gravity. In final step 33, the height adjustment device 26 is fastened between the machine frame 3, particularly the mounting aid 16, and the support housing 9. The mounting procedure is thus completed.

Figure 21:
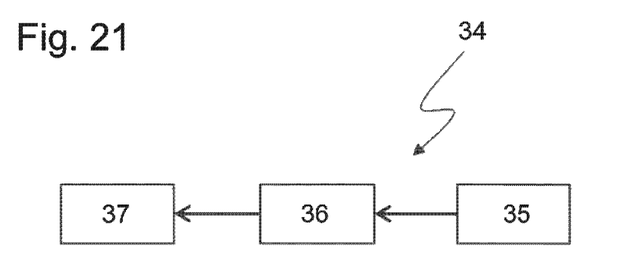
FIG. 21 is a flow chart of the method for demounting the transverse distribution device from a road paver.

FIG. 21 shows an example of a method 34 for demounting a transverse distribution device 8 from the road paver 1. The method 34 for demounting the transverse distribution device 8 essentially corresponds to the mounting method 30, although in reverse order. The method starts at step 35 with removing the height adjustment device 26, followed by lifting the transverse distribution device 8 and the support housing 9 in step 36. In step 37, the sliding devices 17 are then pulled out of the expanded insertion portions 13 of the oblong holes 12. After that, the demounting procedure is already completed. This is also achieved in a particularly quick and simple manner due to the invention.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A road paver for paving a subbase layer in a working direction (a), comprising:
   a machine frame,
   a traveling mechanism,
   a material hopper for receiving paving material,
   a paving screed for smoothing and compacting the paving material,
   a transverse distribution device for distributing paving material in the working direction (a) in front of the paving screed and transversely to the working direction (a), the transverse distribution device being supported at the machine frame via a support housing, and
   a height adjustment device for vertical adjustment of the transverse distribution device relative to the machine frame,
   wherein the support housing is supported at the machine frame such that the support housing is height-adjustable via a quick coupling apparatus, wherein the quick coupling apparatus comprises at least one oblong hole with an expanded insertion portion and a sliding device, wherein the sliding device can be inserted into the oblong hole through the expanded insertion portion, wherein the sliding device in the inserted state slides in the region of the oblong hole outside the expanded insertion portion-during vertical adjustment of the transverse distribution device through the height adjustment device, wherein the sliding device is supported in a form-closed manner in a direction perpendicular to the height adjustment in this region, wherein the sliding device comprises a sliding pin and a sliding anchor with an anchor plate, wherein the anchor plate has an extension transverse to the working direction which is smaller than the expanded insertion portion of the oblong hole and larger than the oblong hole in the region of the oblong hole outside the expanded insertion portion, wherein the sliding device is configured such that the sliding distance between the anchor plate of the sliding anchor and the component to which the sliding device is fastened can be set by a sliding distance adjustment apparatus, and wherein the sliding device comprises a spacer configured such that there is always at least a minimum sliding distance which essentially corresponds to the thickness of the support plate and/or the connection plate.

2. The road paver according to claim 1,
wherein the at least one oblong hole is arranged in a support plate of the machine frame of the road paver and the sliding device is arranged on a connection plate of the support housing or
the at least one oblong hole is arranged in a connection plate of the support housing and the sliding device is arranged on a support plate of the machine frame of the road paver.

3. The road paver according to claim 1,
wherein in a mounted state of the transverse distribution device, the sliding distance adjustment apparatus is arranged at the rear of the road paver in the working direction (a) and can be accessed from the rear of the road paver for actuation.

4. The road paver according to claim 1,
wherein the quick coupling apparatus comprises at least three oblong holes and three sliding devices, wherein the oblong holes and the sliding devices are respectively spaced from one another transversely to the working direction and/or vertically.

5. The road paver according to claim 1,
wherein the transverse distribution device is supported at the machine frame exclusively via the quick coupling apparatus and the height adjustment device.

6. The road paver according to claim 1,
wherein the height adjustment device is configured such that its stroke corresponds to the extension of the region of the oblong hole outside the expanded insertion portion.

7. The road paver according to claim 1,
wherein the sliding device is provided with a stop surface which is configured to interact with a stopper provided on the support housing so as to rotationally lock the sliding device in its position.

8. The road paver according to claim 1,
wherein a mounting aid including a stop for the support housing is provided, wherein the mounting aid and the support housing are configured such that the sliding device and the expanded insertion portion of the oblong hole are at equal height when the support housing strikes against the mounting aid.

9. The road paver according to claim 8, wherein the mounting aid includes an inclined face, along which the support housing can be guided in a sliding manner until the sliding device and the expanded insertion portion of the oblong hole are at equal height.

10. The road paver according to claim 8, wherein the mounting aid is configured as a bearing for the height adjustment device.

11. A method for mounting a transverse distribution device on a road paver according to claim 1, comprising the steps of:
inserting a sliding device via an expanded insertion portion of an oblong hole into said oblong hole, and
arranging a height adjustment device between the road paver and the transverse distribution device, wherein the sliding device in the inserted state is guided in a sliding manner in the region of the oblong hole outside the expanded insertion portion during vertical adjustment of the transverse distribution device through the height adjustment device, wherein the sliding device is supported in a form-closed manner in a direction perpendicular to the height adjustment in this region.

* * * * *